United States Patent Office 3,242,202
Patented Mar. 22, 1966

3,242,202
PROCESS FOR THE MANUFACTURE OF N-ALKYL-N-HALOGENMETHYL-ACYLAMINO COMPOUNDS
Helmuth Kritzler, Cologne-Flittard, Kuno Wanger, Leverkusen-Bayerwerk, and Hans Holtschmidt, Cologne-Stammheim, Germany, assignors to Farbenfabriken Bayer Aktiengesellschaft, Leverkusen, Germany, a corporation of Germany
No Drawing. Filed July 18, 1962, Ser. No. 210,847
Claims priority, application Germany, Aug. 16, 1961, F 34,700
9 Claims. (Cl. 260—455)

The present invention relates to a new process for the manufacture of the hitherto unknown N-alkyl-N-halogenmethylacylamino compounds.

An object of the present invention is to make available hitherto unknown N - alkyl-N-halogenmethylacylamino compounds, as well as a new process for manufacturing them. It is a further object of the invention to manufacture the new compounds in the simplest possible manner which is also suitable for manufacture on an industrial scale. Further objects of the invention will be clear from the following description and examples.

It has been found that N-alkyl-N-halogenmethylacylamino compounds may be obtained in a simple manner by reacting 1,3,5-trialkyl-hexahydro-s-triazine of the general formula

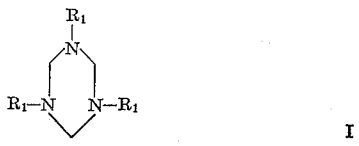

in which the radicals $R_1$ represent branched or unbranched, saturated or unsaturated aliphatic, araliphatic or cycloaliphatic radicals which may or may not contain further substituents, with halogenacyl compounds of the general formula

in which $R_2$ represents chlorine or saturated or unsaturated, branched or unbranched aliphatic, araliphatic, cycloaliphatic or aromatic radicals or alkoxy-, phenoxy-, alkylmercapto- or phenylmercapto groups, which radicals may or may not contain further substituents such as, for example, halogen atoms, and where X represents a halogen atom such as fluorine, chlorine or bromine.

The compounds obtained in accordance with the invention may be represented by the following general formula

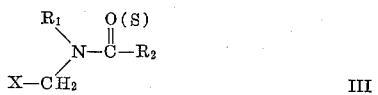

where $R_1$, $R_2$ and X have the meanings given above.

The course of the reaction of the process of the invention must be regarded as distinctly surprising. It could not have been foreseen that halogenacyl compounds of the general Formula II would react with 1,3,5-trialkyl-hexahydro-s-triazines of the general Formula I with opening of the ring to form the specified N-alkyl-halogenmethyl-acylamino compounds of the general Formula III. Furthermore, it was not foreseeable that the N-alkyl-N-halogenmethyl acylamino compounds prepared according to the invention, which contain the extremely reactive N-halogen - methyl group, would have sufficient thermal stability to permit of their isolation by fractional distillation.

The N-alkyl-N - halogenmethylacylamino compounds prepared in accordance with the invention are mostly new, hitherto unknown compounds. Insofar as one or other of these compounds prepared in accordance with the invention have been described in the literature, they could hitherto be obtained only with difficulty and by complicated methods. The N-alkyl-N-halogenmethyl-acylamino compounds prepared in accordance with the process of the invention are obtained in good yields as distillable substances of high purity.

The 1,3,5-trialkyl-hexahydro - s - triazines used in the reaction according to the present invention are prepared by known methods by condensation of formaldehyde with the corresponding primary amines. It is, however, generally found to be advantageous to use the formaldehyde not in the form of its aqueous solution for condensation with the amines, but in the form of the formaldehyde semi-acetal obtained from molar quantities of paraformaldehyde and aliphatic alcohols with the addition of catalytic quantities of alkali. Preferably a methyl-formaldehyde-semiacetal is subjected to condensation with the corresponding amines. The 1,3,5-trialkylhexahydro-s-triazines are isolated by fractional distillation if desired under reduced pressure. Examples of such 1,3,5-trialkyl-hexahydro-s-triazines are: 1,3,5-trimethylhexahydro-s-triazine, 1,3,5-triethyl-hexahydro-s-triazine, 1,3,5-tri-n-propyl-hexahydro-s-triazine, 1,3,5-tri-n-butylhexahydro-s-triazine, 1,3,5-tri-iso-butyl - hexahydro-s-triazine, 1,3,5-triallyl-hexahydro-s-triazine, 1,3,5 - tricyclohexyl - hexahydro-s-triazine, 1,3,5-tribenzyl - hexahydro - s - triazine and 1,3,5-tri(3' - methoxy - propyl) - hexahydro - s-triazine.

Examples of halogenacyl compounds of the general Formula II suitable for the reaction are: Phosgene, thiophosgene chlorofumaric acid methyl ester, chloroformic acid ethyl ester, chlorofumaric acid phenyl ester, chloroformic acid benzyl ester, thiocarbonic acid-O-ethyl ester chloride, thiocarbonic acid-O-phenyl ester chloride, thiocarbonic acid-S-phenyl ester chloride, acetyl chloride, acetyl bromide, methacrylic acid chloride, propionyl chloride and benzoyl chloride.

Examples of N-alkyl-N-halogenmethyl-acylamino compounds prepared in accordance with the process of the invention are: N-methyl-N-chloromethyl-carbaminic acid chloride, N-ethyl-N-chloromethyl-carbaminic acid chloride, N-n-propyl-N-chloromethyl-carbaminic acid chloride, N-n-butyl-N-chloromethyl-carbaminic acid chloride, N-isobutyl-N-chloromethyl-carbaminic acid chloride, N-allyl-N-chloromethyl-carbaminic acid chloride, N-cyclohexyl-N-chloromethyl-carbaminic acid chloride, N-methyl N - chloromethyl - thiocarbaminic acid chloride, N-methyl-N-chloromethyl-carbaminic acid methyl ester, N-methyl-N-chloromethyl-carbaminic acid ethyl ester, N-methyl-N-chloromethyl-carbaminic acid phenyl ester, N-methyl-N-chloromethyl-thiocarbaminic acid-O-ethyl ester, N-methyl - N - chloromethyl - thiocarbaminic acid - O-phenyl ester, N-methyl-N-chloromethyl - thiocarbaminic acid - S - phenyl ester, N-methyl-N-chloromethyl-acetamide, N-methyl-N-chloromethyl-propionic acid amide and N-methyl-N-chloromethyl-methacrylic acid amide.

The process of the invention is advantageously carried out in an inert organic solvent. Aliphatic and aromatic hydrocarbons and their chlorination products are preferably used as organic solvents. Examples of such solvents are benzene, toluene, chlorobenzene, methylene chloride, chloroform, carbon tetrachloride, ethylene chloride and 1,1,2,2-tetrachloroethane.

The process of the invention may be carried out at temperatures between —40° C. and the boiling point of the solvent used, that is up to about 150° C. One suitable method of carrying out the process of the invention consists in reacting the reaction components at 0° C. and then raising the reaction temperature to above 20° C.

In carrying out the process of the invention, it is advantageous to use 3 mols of halogenacyl compound to 1 mol of 1,3,5-trialkyl-hexahydro-s-triazine. The molar ratio of halogenacyl compound to 1,3,5-trialkyl-hexahydro-s-triazine may well be further increased, and this is frequently advantageous. Preferably 3–10 mols halogenacyl compound are used for 1 mol of 1,3,5-trialkyl-hexahydro-s-triazine. Other reaction ratios may of course be used, e.g. a ratio of 1:1.

The reaction may, for example, be carried out by first introducing the solvent for the reaction into the reaction vessel and cooling it to 0° C. The halogenacyl compound is then added or, in the case of phosgene, incorporated by condensation. The 1,3,5-trialkyl-hexahydro-s-triazine, which is preferably dissolved in the same solvent as that in which the reaction is carried out, is then added dropwise into the reaction vessel with stirring and further cooling to 0° C. After the 1,3,5-trialkyl-hexahydro-s-triazine has been introduced, the mixture is stirred for a considerable time at 0° C. To complete the reaction, it is often advantageous to allow the reaction mixture to stand subsequently for some time at elevated temperature.

The reaction product is worked up by known methods. Advantageously, the reaction mixture is subjected to fractional distillation if desired under reduced pressure.

The N-alkyl-N-halogenmethyl-acylamino compounds prepared by the process of the invention are valuable intermediate products for the manufacture of plastics and plastic auxiliary products and dyestuffs.

The compounds of the invention are, in addition, suitable for cross-linking plastics which contain free hydroxyl groups. In particular, simple polyester resins with free hydroxyl groups e.g. between 2 and 15% free hydroxyl groups may be cross-linked by the compounds of the invention. 5–50% of the compound of the invention, calculated on the plastic, is added to the plastic which is to be cross linked, which may be in solution. To effect cross-linking, the mixture is then heated to temperatures between 20 and 150° C. Cross-linking is generally complete after a few hours. A representative example for this use of the compounds of the invention will be given in the last paragraph of Example 1. The other compounds of the invention may be used in the same way as N-methyl-N-chloromethyl-carbaminic acid chloride.

The present invention is further disclosed in the following examples which are illustrative but not limitative thereof.

EXAMPLE 1

387 parts by weight of 1,3,5-trimethyl-hexahydro-s-triazine dissolved in 300 parts by volume of chloroform are added dropwise with stirring and cooling into a solution, cooled to 0 to −10° C., of 1000 parts by volume of chloroform and 1200 parts by weight of phosgene, the addition being carried out at such a rate that the reaction temperature does not rise above 0° C. The mixture is then stirred for another 30 minutes at 0° C., and then boiled for one hour under reflux while phosgene is passed through. When all the excess phosgene has been driven off by means of a current of dry nitrogen, the solvent is first distilled off and the remaining residue is subjected to vacuum distillation. Renewed distillation of the reaction product through a silver column 50 cm. long yields 668 parts by weight of N-methyl-N-chloromethyl-carbaminic acid chloride at B.P.$_{12}$ 74° C.

*Analysis.*—Calculated: 25.38% C, 3.55% H, 49.94% Cl, 11.27% O, 9.87% N. Found: 25.41% C, 3.97% H, 49.55% Cl, 11.39% O, 10.16% N.

*Example for manufacturing a film*

10 parts by weight of a polyester of 3 mols of phthalic acid, 3.7 mols of trimethylolpropane and 0.3 mol of ethanolamine having a hydroxyl group content of 10.2% are dissolved in 15 parts by weight of a solvent mixture of equal parts of toluene and ethyl- and butyl acetate. 4.3 parts by weight of N-methyl-N-chloromethyl-carbaminic acid chloride are added to the solution. The mixture obtained is poured on to a glass support to form a film. The film is dried out and cross-linked by the carbaminic acid chloride in 2 hours at 100° C.

EXAMPLE 2

Under similar reaction conditions to those in Example 1, 450 parts by weight of phosgene, dissolved in 800 parts by volume of chloroform, are reacted with 109 parts by weight of 1,3,5-triethyl-hexahydro-s-triazine, dissolved in 100 parts by volume of chloroform. After distillation through a silver column 50 cm. in length, 142 parts by weight of N-ethyl-N-chloromethyl-carbaminic acid chloride are obtained, B.P.$_{12}$ 83° C.

*Analysis.*—Calculated: 30.79% C, 4.52% H, 45.45% Cl, 10.26% O, 8.98% N. Found: 31.37% C, 4.85% H, 45.15% Cl, 10.15% O, 9.35% N.

EXAMPLE 3

The procedure used is the same as in Example 1. 900 parts by weight of phosgene dissolved in 900 parts by volume of chloroform are reacted with 426 parts by weight of 1,3,5-tri-n-propyl-hexahydro-s-triazine dissolved in 300 parts by volume of chloroform. Distillation through a silver column 50 cm. in length yields 506 parts by weight of N-n-propyl-N-chloromethyl-carbaminic acid chloride, boiling point at 12 mm. Hg 94° C.

*Analysis.*—Calculated: 35.32% C, 5.34% H, 41.70% Cl, 9.41% O, 8.24% N. Found: 36.01% C, 5.60% H, 41.70% Cl, 9.00% O, 8.27% N.

EXAMPLE 4

Under the same experimental conditions as in Example 1, 450 parts by weight of phosgene dissolved in 800 parts by volume of chloroform are reacted with 160 parts by weight of 1,3,5-tri-n-butyl-hexahydro-s-triazine dissolved in 150 parts by volume of chloroform. Distillation yields, at boiling point 106° C. at 12 mm. Hg, 212 parts by weight of N-n-butyl-N-chloromethyl-carbaminic acid chloride.

*Analysis.*—Calculated: 39.15% C, 6.02% H, 38.52% Cl, 8.69% O, 7.61% N. Found: 38.99% C, 6.04% H, 38.30% Cl, 9.31% O, 7.83% N.

EXAMPLE 5

Under similar experimental conditions as in Example 1, 246 parts by weight of 1,3,5-triallyl-hexahydro-s-triazine, dissolved in 250 parts by volume of chloroform, are reacted with 600 parts by weight of phosgene dissolved in 800 parts by volume of chloroform. Distillation through a silver column 50 cm. long yields 137 parts by weight of N-allyl-N-chloromethyl-carbaminic acid chloride having a boiling range 91–95° C. at 13 mm. Hg.

*Analysis.*—Calculated: 35.74% C, 4.20% H, 42.20% Cl, 8.34% N. Found: 36.62% C, 4.78% H, 42.70% Cl, 8.70% N. Iodine number: Calculated 152; found 142.6.

EXAMPLE 6

133 parts by weight of 1,3,5-tricyclohexyl-hexahydro-s-triazine dissolved in 200 parts by volume of chloroform are introduced at 0° C. into a cooled solution of 350 parts by volume of chloroform and 360 parts by weight of phosgene. The mixture is then stirred for 30 minutes at 0° C. and then phosgenated for 1½ hours under reflux. When the excess phosgene has been driven off with dry nitrogen, the solvent is distilled off. Distillation of the reaction product through a silver column 35 cm. long yields 160 parts by weight of N-cyclohexyl-N-chloromethyl-carbaminic acid chloride, boiling range 145–147° C. at 12 mm. Hg.

*Analysis.*—Calculated: 45.73% C, 6.24% H, 33.75% Cl, 7.62% O, 6.67% N. Found: 46.25% C, 6.39% H, 33.20% Cl, 8.20% O, 6.92% N.

EXAMPLE 7

129 parts by weight of 1,3,5-trimethyl-hexahydro-s-triazine dissolved in 200 parts by volume of chloroform are introduced, with stirring and cooling, into a solution of 690 parts by weight of thiophosgene and 800 parts by volume of chloroform cooled to 0 to −10° C., at such a rate that the reaction temperature does not rise above 0° C. The mixture is then heated and boiled under reflux for one hour. After distilling off the solvent and excess thiophosgene, the reaction product is subjected to vacuum distillation. Fresh distillation through a silver column 40 cm. long yields 116 parts by weight of N-methyl-N-chloromethyl-thiocarbaminic acid chloride, boiling range 109–112° C. at 12 mm. Hg.

*Analysis.*—Calculated: 22.80% C, 3.19% H, 44.87% Cl, 20.29% S, 8.86% N. Found: 22.97% C, 3.26% H, 45.15% Cl, 19.13% S, 9.32% N.

EXAMPLE 8

A solution of 129 parts by weight of 1,3,5-trimethyl-hexahydro-s-triazine and 200 parts by volume of methylene chloride are introduced, with stirring and cooling, into a solution of 567 parts by weight of chloroformic acid methyl ester and 600 parts by volume of methylene chloride, cooled to 0 to −10° C. at such a rate that the reaction temperature does not exceed 0° C. The mixture is then stirred for one hour and the excess solvent and excess chlorofumaric acid methyl ester are distilled off. The residue which remains is then subjected to a vacuum distillation. Fresh distillation of the reaction product through a silver column 50 cm. long yields 342 parts by weight of N-methyl-N-chloromethyl-carbaminic acid methyl ester, boiling within the range 70 to 72° C. at 12 mm. Hg.

*Analysis.*—Calculated: 34.92% C, 5.86% H, 25.77% Cl, 23.26% O, 10.18% N. Found: 35.25% C, 5.98% H, 25.5% Cl, 23.83% O, 10.22% N.

EXAMPLE 9

Under similar experimental conditions as those given in Example 8, 651 parts by weight of chloroformic acid ene chloride, reacted with 129 parts by volume of methylene chloride, reacted with 129 parts by weight of 1,3,5-trimethyl-hexahydro-s-triazine dissolved in 200 parts by volume of methylene chloride. After distillation through a silver column 40 cm. long, 393 parts by weight of N-methyl-N-chloromethyl-carbaminic acid ethyl ester are obtained, boiling range 74 to 76° C. at 11 mm. Hg.

*Analysis.*—Calculated: 39.62% C, 6.65% H, 23.39% Cl, 21.11% O, 9.24% N. Found: 40.19% C, 6.83% H, 24.00% Cl, 19.29% O, 9.66% N.

EXAMPLE 10

The same method is used as in Example 8. 626 parts by weight of chloroformic acid phenyl ester, dissolved in 600 parts by volume of methylene chloride are reacted with 86 parts by weight of 1,3,5-trimethyl-hexahydro-s-triazine dissolved in 100 parts by volume of methylene chloride. Distillation above a silver column 30 cm. long yields 311 parts by weight of N-methyl-N-chloromethyl-carbaminic acid phenyl ester, B.P. 154° C. at 12 mm. Hg.

*Analysis.*—Calculated: 54.15% C, 5.05% H, 17.76% Cl, 16.03% O; 7.02% N. Found: 53.94% C, 5.08% H, 18.30% Cl, 16.23% O, 7.33% N.

EXAMPLE 11

129 parts by weight of 1,3,5-trimethyl-hexahydro-s-triazine dissolved in 200 parts by volume of chloroform are introduced into a solution of 235.5 parts by weight of acetyl chloride in 500 parts by volume of chloroform, cooled to 0 to −10° C., care being taken that the reaction temperature does not exceed 0° C. The mixture is then stirred for one hour and then boiled for an hour under reflux. After distilling off the solvent, the remaining residue is subjected to a vacuum distillation. Further distillation of the reaction product through a silver column 40 cm. long yields 203 parts by weight of N-methyl-N-chloromethyl-acetamide, boiling range 87 to 89° C. at 12 mm. Hg.

*Analysis.*—Calculated: 39.52% C, 6.63% H, 29.17% Cl, 13.16% O, 11.52% N. Found: 39.25% C, 6.79% H, 30.30% Cl, 13.25% O, 11.74% N.

EXAMPLE 12

418 parts by weight of methacrylic acid chloride dissolved in 400 parts by volume of chloroform are treated under the same conditions as in Example 11 with 86 parts by weight of 1,3,5-trimethyl-hexahydro-s-triazine dissolved in 100 parts by volume of chloroform. After stirring for one hour and distilling off the solvent and the excess methacrylic acid chloride, the reaction product is subjected to a vacuum distillation. Further distillation of the reaction product yields 106 parts by weight of N-methyl-N-chloromethyl-methacrylic acid amide, boiling range 67 to 68° C. at 0.1 mm. Hg.

*Analysis.*—Calculated: 48.82% C, 6.83% H, 24.02% Cl, 10.84% O, 9.49% N. Found: 48.52% C, 6.85% H, 24.45% Cl, 11.48% O, 9.62% N. Iodine number: Calculated 172; found 164.

EXAMPLE 13

Under the same experimental conditions as in Example 11, 345 parts by weight of trichloroacetylchloride dissolved in 400 parts by volume of chloroform are reacted with 82 parts by weight of 1,3,5-trimethyl-hexahydro-s-triazine dissolved in 100 parts by volume of chloroform. After boiling under reflux for one hour, the solvent is distilled off and the reaction product is subjected to a vacuum distillation. Subsequent distillation of the reaction product through a column 20 cm. long yields 314 parts by weight of N-methyl-N-chloromethyl-trichloro-acetamide, boiling range 119 to 125° C. at 12 mm. Hg.

*Analysis.*—Calculated: 21.36% C, 2.24% H, 63.06% Cl, 7.11% O, 6.23% N. Found: 21.35% C, 2.32% H, 63.05% Cl, 7.70% O, 6.42% N.

EXAMPLE 14

Under the experimental conditions given in Example 8, 567 parts by weight of chloroformic acid methyl ester dissolved in 600 parts by volume of methylene chloride are reacted with 255 parts by weight of 1,3,5-tri-isobutyl-hexahydro-s-triazine dissolved in 150 parts by volume of methylene chloride. The mixture is then heated and then boiled for 1½ hours under reflux. After distilling off the solvent and excess chloroformic acid methyl ester, the reaction product is subjected to vacuum distillation. Further distillation through a silver column 50 cm. long yields 363 parts by weight of N-isobutyl-N-chloromethyl-carbaminic acid methyl ester, boiling point 98° at 13 mm. Hg.

*Analysis.*—Calculated: 46.80% C, 7.86% H, 17.81% O, 7.80% N, 19.74% Cl. Found: 46.83% C, 7.83% H, 18.56% O, 8.02% N, 19.4% Cl.

EXAMPLE 15

The process is carried out as in Example 8. 567 parts by weight of chloroformic acid methyl ester dissolved in 600 parts by volume of chloroform are reacted with 207 parts by weight of 1,3,5-triallyl-hexahydro-s-triazine dissolved in 200 parts by volume of chloroform. After heating and then boiling under reflux for one hour, the solvent and excess chloroformic acid methyl ester are distilled off. The reaction product is subjected to a vacuum distillation, and after further distillation through a silver column 30 cm. long, 200 parts by weight of N-allyl-N-chloromethylcarbaminic acid methyl ester are obtained, boiling range 91 to 92° at 13 mm. Hg.

*Analysis.*—Calculated: 44.05% C, 6.16% H, 19.56% O, 8.56% N, 21.67% Cl. Found: 44.43% C, 6.25% H, 19.50% O, 8.78% N, 21.30% Cl.

EXAMPLE 16

Chloroformic acid benzyl ester is prepared as described in Org. Synth. III, 167 by reacting 436 parts by weight of phosgene with 432 parts by weight of benzyl alcohol. The chloroformic acid benzyl ester obtained as crude product is taken up in 800 parts by volume of methylene chloride, and the solution is cooled to 0°. 86 parts by weight of 1,3,5-trimethyl-hexahydro-s-triazine dissolved in 100 parts by volume of methylene chloride are then added dropwise, with stirring and cooling, in such a manner that the reaction temperature does not rise above 0° C. After heating to room temperature, the mixture is stirred for another 2 hours and the solvent and excess chloroformic acid benzyl ester and its thermal decomposition products are distilled off. The reaction product is then distilled in an oil pump vacuum, and after further distillation through a silver column 25 cm. long, 286 parts by weight of N-methyl-N-chloromethyl-carbaminic acid benzyl ester, boiling range 121 to 122° C. at 0.35 mm. Hg are obtained.

*Analysis.*—Calculated: 56.21% C, 5.66% H, 14.98% O, 6.56% N, 16.59% Cl. Found: 56.36% C, 5.78% H, 15.31% O, 6.71% N, 16.55% Cl.

EXAMPLE 17

Under the experimental conditions given in Example 1, 350 parts by weight of phosgene dissolved in 500 parts by volume of chloroform are reacted with 357 parts by weight of 1,3,5-tribenzyl-hexahydro-s-triazine dissolved in 300 parts by volume of chloroform. The mixture is then stirred for another 30 mniutes at 0° and then slowly heated to boiling. After boiling for ½ hour under reflux, the excess phosgene has escaped. The solvent is then distilled off and the remaining residue is subjected to distillation in an oil pump vacuum. Fresh distillation of the reaction product through a silver column 30 cm. long yields 260 parts by weight of N-benzyl-N-chloromethyl-carbaminic acid chloride, boiling range 110 to 118° at 0.3 to 0.4 mm. Hg.

*Analysis.*—Calculated: 49.56% C, 4.16% H, 7.34% O, 6.42% N, 32.51% Cl. Found: 49.58% C, 4.32% H, 7.64% O, 6.84% N, 32.35% Cl.

EXAMPLE 18

735 parts by weight of chloroformic acid isopropyl ester dissolved in 700 parts by volume of methylene chloride are reacted, as described in Example 8, with 129 parts by weight of 1,3,5-trimethyl-hexahydro-s-triazine dissolved in 150 parts by volume of methylene chloride. After removal of the solvent and excess chloroformic acid isopropyl ester, the reaction product obtained is subjected to a vacuum distillation. Fresh distillation through a silver column 30 cm. long yields 426 parts by weight of N-methyl-N-chloromethyl-carbaminic acid isopropyl ester, boiling point 78° at 11 mm. Hg.

*Analysis.*—Calculated: 43.51% C, 7.30% H, 19.32% O, 8.46% N, 21.41% Cl. Found: 43.07% C, 7.31% H, 19.12% O, 8.82% N, 21.40% Cl.

EXAMPLE 19

125 parts by weight of dithiocarbonic acid-S-n-butyl ester-chloride dissolved in 150 parts by volume of methylene chloride are reacted at 0° with 29.5 parts by weight of 1,3,5-trimethyl-hexahydro-s-triazine dissolved in 50 parts by volume of methylene chloride. The mixture is then stirred for another two hours at room temperature, and the reaction mixture is distilled. After distilling twice in a high vacuum, 83 parts by weight of N-methyl-N-chloromethyl-thiocarbaminic acid-S-n-butyl ester are obtained, boiling range 95–96° at 0.15 mm. Hg.

*Analysis.*—Calculated: 42.96% C, 7.21% H, 16.38% S, 7.16% N, 18.12% Cl. Found: 43.31% C, 7.35% H, 16.45% S, 7.37% N, 17.95% Cl.

We claim:

1. Process for the production of N-alkyl-N-halogenmethyl-acylamino compounds which comprises reacting at temperatures between − 40 and 150° C. a 1,3,5-trialkyl-hexahydro-s-triazine having the formula:

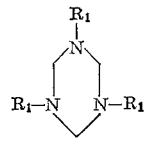

I wherein $R_1$ represents a member selected from the group consisting of $C_1$–$C_4$ alkyl, cyclohexyl and benzyl with a halogenacyl compound having the formula:

II wherein $R_2$ represents a member selected from the group consisting of chlorine, $C_1$–$C_4$ alkyl, cyclohexyl, benzyl and phenyl, $C_1$–$C_4$ alkoxy, phenoxy, $C_1$–$C_4$ alkylmercapto, and phenylmercapto radicals, X represents a halogen atom and Y represents a member selected from the group consisting of oxygen and sulfur atoms and recovering N-alkyl-N-halogen methyl acylamino compound thereby formed from the reaction mixture.

2. Process according to claim 1, wherein the reaction is carried out in the presence of an inert organic solvent.

3. Process according to claim 1, wherein said 1,3,5-trialkyl-hexahydro-s-triazine compound is reacted with phosgene.

4. Process according to claim 1 wherein said 1,3,5-trialkyl-hexahydro-s-triazine compound is reacted with thiophosgene.

5. Process according to claim 1, wherein said 1,3,5-trialkyl-hexahydro-s-triazine compound is reacted with carbonic acid ester halide.

6. Process according to claim 1, wherein said 1,3,5-trialkyl-hexahydro-s-triazine compound is reacted with thiocarbonic acid ester halide.

7. Process according to claim 1, wherein said 1,3,5-trialkyl-hexahydro-s-triazine compound is reacted with a carboxylic acid halide.

8. Process according to claim 2 wherein said inert organic solvent is a member selected from the group consisting of benzene, toluene, chlorobenzene, methylene chloride, chloroform, carbon tetrachloride, ethylene chloride, and 1,1,2,2-tetrachloroethane.

9. Process according to claim 1 which comprises effecting said reaction with from 1–10 mols of said halogenacyl compound per mol of 1,3,5,-trialkyl-hexahydro-s-triazine.

References Cited by the Examiner

Graymore: J. Chem. Soc., 1931, 1490–1494.
Graymore: J. Chem. Soc., 1935, 865–866.
Pace: Gazetta Chemica Italiana 59, 578–585 (1929).
Smolin et al.: The Chemistry of Heterocyclic Compounds, S-Triazines and Derivatives, pages 479–480 (1959), Interscience Publishers Inc., New York, N.Y.

CHARLES B. PARKER, *Primary Examiner.*

DANIEL D. HORWITZ, *Examiner.*